United States Patent [19]

Panthöfer et al.

[11] 4,416,037

[45] Nov. 22, 1983

[54] RELEASABLE CONNECTOR IN LEASHES FOR DOMESTIC ANIMAL, SAFETY LINE OR THE LIKE

[75] Inventors: Rudolf Panthöfer, St. Augustin; Hans Ley, Much; Manfred Schmidt, Much, all of Fed. Rep. of Germany

[73] Assignee: Tetra Werke Dr. rer. nat. Ulrich Baensch GmbH, Melle, Fed. Rep. of Germany

[21] Appl. No.: 280,520

[22] Filed: Jul. 6, 1981

[30] Foreign Application Priority Data

Jul. 11, 1980 [DE] Fed. Rep. of Germany ....... 3026418

[51] Int. Cl.³ .............................................. A44B 17/00
[52] U.S. Cl. ....................................... 24/665; 24/677
[58] Field of Search ............................. 24/211 L, 217

[56] References Cited

U.S. PATENT DOCUMENTS

3,482,291 12/1969 Lehmann ........................ 24/211 L

FOREIGN PATENT DOCUMENTS

797623 5/1936 France ............................. 24/211 L

*Primary Examiner*—Robert Peshock
*Attorney, Agent, or Firm*—Fulwider, Patton, Rieber, Lee & Utecht

[57] ABSTRACT

A releasable connector in leashes for domestic animals, safety lines or the like, comprising a coupling portion (12) provided with a spherical, drop-shaped or similarly shaped head member (14), and a holding portion (10) adapted to be coupled to the holding portion.

In order to provide for easier handling and for improving the safeness against unintentional release of the connector, the holding portion (10) includes a lateral inlet (16) in the form of a guiding channel (24) extending approximately normal to the direction of pull (Z) and being slotted at least at the coupling portion side and conformed in configuration to the head member (14) of the coupling portion (12).

A lock bolt (18) extends into the guiding channel (24), which lock bolt is adapted to be moved in a plane extending approximately in parallel with the direction of pull (Z).

8 Claims, 3 Drawing Figures

RELEASABLE CONNECTOR IN LEASHES FOR DOMESTIC ANIMAL, SAFETY LINE OR THE LIKE

The present invention relates to a releasable connector, comprising a locking element adapted to be moved in a plane extending approximately in parallel with the direction of pull or tension, a coupling portion having a spherical, drop-shaped or similarly shaped head member, and a holding portion adapted to be coupled or joined to the coupling portion and having a lateral inlet for inserting and coupling said spherical, drop-shaped or similarly shaped head member of said coupling portion, for use in leashes for domestic animals, safety lines or other lines subjected to tension loads, belts or the like.

A releasable connector of this type is known from laid-open German patent application No. 2,846,087. In this construction, the holding portion comprises a housing with a cavity being open on one side and acting to receive the head member of the coupling portion. A lock cylinder is slidably fitted over the housing, which lock cylinder has a keyhole-shaped opening through which the head member of the coupling portion may be inserted into the cavity of the housing. In order to prevent unintentional disengagement of the head member of the coupling portion through the opening of the lock cylinder, the latter has positioned on the inner side thereof a leaf spring extending into the opening, which spring is urged rearwards when the head member is inserted into the cavity.

In order to release the head member of the coupling portion, the lock cylinder is moved against the action of a spring relative to the holding portion or its housing. Then, the head member of the coupling portion is allowed to slide out from the cavity at the open side thereof. Actuation of the lock cylinder is effected by means of a drawstring connected thereto. In cooperation with the described leaf spring, the lock cylinder acts as a locking element.

The prior construction is characterized by relatively complex structure and complicated handling. In particular, this construction includes a great number of separate parts. For releasing the connection, the drawstring connected to the lock cylinder must be pulled against the force of a spring. When the prior connector is used for dog leashes, the pulling force exerted for releasing the connection is directly transmitted to the neck of the animal, this being quite uncomfortable to the animal so as to cause it to rattle in its throat. For this reason, careful animal holders would refuse the prior construction.

Furthermore, it is disadvantageous in the prior construction that the lock cylinder is apt to be moved to its releasing position by external causes, such as by branches of trees or the like. This risk is particularly imminent when a leashed animal is led through underwood or the like. Also, unintentional unlocking may be brought about very easily by the leash itself, for example, when the leash comes into contact with the lock cylinder in the case of a very nervous animal.

Finally, it is also of disadvantage in the prior connector that the lock cylinder is loaded directly by the pulling force or by a pulling force component, such that under certain circumstances it may be extremely difficult to move it to its releasing position under a very high pulling force.

Accordingly, it is the object of the present invention to further develop and improve the prior construction to the effect that improved safety against unintentional release is provided regardless of simplified handling and construction.

Accordingly to the present invention, this object is solved in that the lateral inlet in the holding portion is defined by a guiding channel extending approximately normal to the direction of pull, being slotted at least at the coupling portion side and conformed in configuration to the head member; and that the locking element extends into said guiding channel.

The releasable connector according to the invention comprises a structure including a minimum of basic components, namely a coupling portion having a spherical, drop-shaped or similarly shaped head member;

a holding portion, and a locking element.

These three basic elements are joined together in such a manner that the risk of unintentional unlocking by the leash or by branches of trees or the like is eliminated. This applies especially for the reason that the locking element is mounted to be slidable within the holding portion.

Still further, unlocking of the connector according to the invention can be effected in the most simple way conceivable. It is only necessary to move the locking element so as to clear the guiding channel. Also, the arrangement of the locking element within the holding portion is such that the locking element, in the closed position, is held unloaded by the head member of the coupling portion. Accordingly, easy operability of the locking element is not effected even by a high pulling force exerted on the leash.

The slot being provided according to the invention on the side of the guiding channel opposing the coupling portion, provides for a high degree of freedom of movement of the coupling portion relative to the holding portion. Accordingly, the connector according to the invention in its coupled (connected) state constitutes substantially a universal joint.

According to the present invention, the guiding channel is conformed in configuration to the head member of the coupling portion, such that this head member, in contrast with the prior construction, is capable of smoothly and positively sliding into the locking position and out of such position.

The innermost end of the guiding channel is preferably formed as a bearing seat, preferably as a spherical or ball seat in the case of a spherical head member. This configuration contributes to the flexibility of the connector.

In order to facilitate the insertion of the coupling portion into the guiding channel of the holding portion or the coupling of the coupling portion to the holding portion, respectively, the guiding channel may be tapered in outward direction with a funnel-shaped configuration.

Of particular importance is the direction (of extension) of the guiding channel or of the abutment side of the guiding channel which is loaded by the head member of the coupling portion under a pulling force, respectively, relative to the direction of pull. If it is required that the coupling portion is automatically and instantaneously released from the holding portion when the lock bolt is moved to its unlocking position, the guiding channel or the abutment side of the guiding channel which is loaded by the head member of the coupling portion under a pulling force, respectively, must be slightly inclined in the direction of pull. This feature is desirable especially in the case of safety belts, safety lines or the like, where instantaneous uncoupling is mandatory.

On the other hand, if it is desired that uncoupling under a pulling or tension load takes place only when the holding portion is additionally tilted or pivoted relative to the coupling portion towards the side including the inlet or the guiding channel, respectively, the guiding channel or the abutment side of the guiding channel which is loaded by the head member of the coupling portion under a pulling force, respectively, must be inclined in opposition to the direction of pull. In this case, the angle of inclination is preferably about 86° to 89°.

Below, a preferred embodiment of the connector according to the present invention is described in greater detail by referring to the accompanying drawing, wherein.

Figure 1:
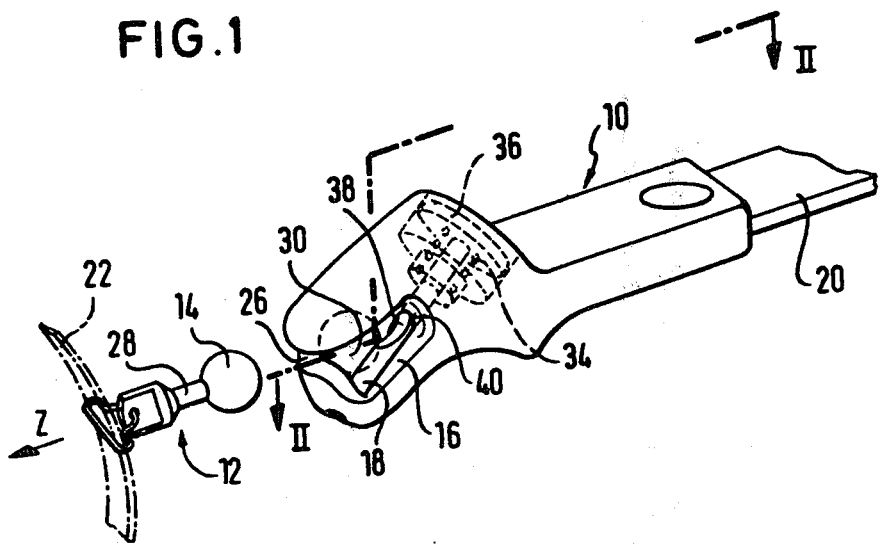
FIG. 1 is a perspective view of the coupling and holding portions of the connector according to the invention, in the uncoupled state thereof.
Figure 2:
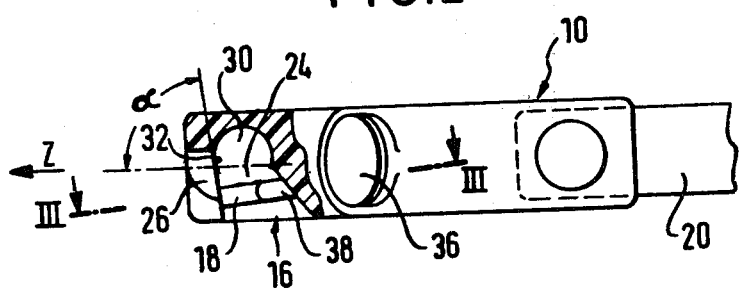
FIG. 2 is a plan view of the holding portion according to FIG. 1, partially in section along lines II—II in FIG. 1.
Figure 3:
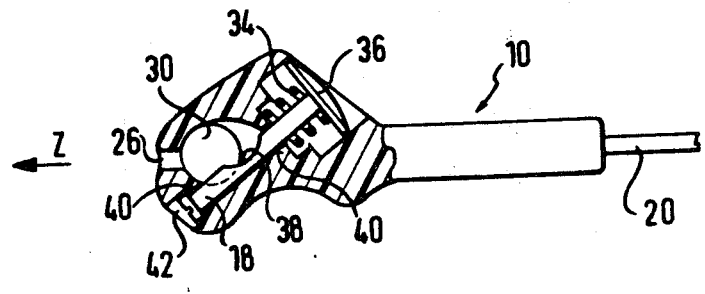
FIG. 3 is a side elevational view of the holding portion according to FIG. 2, partially in section along lines III—III in FIG. 2.

The releasable connector as shown in FIGS. 1 to 3 comprises a holding portion 10 and a coupling portion 12 adapted to be joined to the holding portion and having spherical head member 4. The coupling portion 12 is connected to a collar for dogs or the like, which collar is shown only fragmentarily in FIG. 1. The holding portion 10 which is formed as a grip portion, has connected thereto a leash 20, preferably a leather belt. As appears, for example, from FIG. 2, the holding portion 10 is provided with an inlet 16 for insertion of the head member 14 and for coupling of the coupling portion 12, which inlet extends laterally, i.e. approximately transversely of the direction of pull Z. The inlet 16 is formed by a guiding channel 24 the opening of which is adapted to be closed by a lock bolt 18. In the embodiment shown, the lock bolt 18 is arranged with an inclination relative to the direction of pull Z both in horizontal and vertical projection.

The innermost end of the guiding channel 24 is formed as a spherical or ball seat 30. Accordingly, a kind of swing joint is formed between the coupling portion 12 and the holding portion 10, and for aligning the coupling portion 12 and the holding portion 10 in the direction of pull Z and for relieving the lock bolt 18 of load on the side opposing of the holding portion opposing the coupling portion 12, a slot-shaped recess 26 is formed to extend in the longitudinal direction of the guiding channel, which recess may have passing therethrough the neck-like portion 28 of the coupling portion 12 which joins directly the head member 14. The open width of the slot-shaped recess is naturally smaller than the diameter of the spherical head member 14 such that the latter is securely retained in the holding portion 10.

As appears particularly from FIG. 3, the lock bolt 18 is adapted to be moved from the locking position to the releasing or unlocking position against the action of a spring 34. The lock bolt 18 can be operated at the side opposite from the coupling portion by means of a pushbutton 36 which is mounted in the holding portion 10 in a slightly countersunk state. In this way, it is made sure that unintentional unlocking cannot occur too easily. The end of the lock bolt 18 opposite from the pushbutton 36 is of enlarged diameter and provided with a longitudinal slot, such that this end is compressed when the lock bolt 18 is placed into the associated bore 40 in the holding portion 10. The end of bore 40 opposite from the pushbutton 36 or opposing the coupling portion 12, respectively, is slightly enlarged such that the longitudinally slotted end of the lock bolt 18, when entering this enlarged portion, may resiliently restore its shape so as to retain the lock bolt 18 within the bore 40. The enlarged portion of bore 40 is identified by numeral 42 in FIG. 3.

When the pushbutton 36 is depressed, the lock bolt 18 is moved into the holding portion 10 in a manner that a recess 38 provided in the lock bolt 18 assumes a position in which it defines a part of the guiding channel 24. In this position, the head member 14 can be freely inserted into and removed from the guiding channel 24. Preferably, the recess 38 in the locking position of lock bolt 18 extends into the guiding channel 24 for such a length that, when the head member 14 is inserted into the guiding channel 24, the lock bolt 18 is urged to its unlocking position by the ball member against the action of spring 34. Conversely, however, automatic unlocking under a tension or pulling force exerted on the ball member in the direction of the guiding channel 24 must be prevented. This double effect is obtained particularly when the lock bolt 18 extends approximately in parallel with the direction of pull Z, as shown in the plan view of FIG. 2.

In the embodiment illustrated in FIGS. 1 to 3, the guiding channel 24 or the abutment side 32 of the guiding channel 24 which is loaded by the head member 14 of the coupling portion 12 under a pulling force, respectively, is slightly inclined in opposition to the direction of pull Z. The angle of inclination α relative to the direction of pull Z is about 87°. This embodiment is of particular advantage for dog leashes, since the uncoupling operation can be made in two steps. Even when the lock bolt 18 has already been moved in the unlocking position, the arrangement is not yet released or uncoupled even if the animal pulls strongly. Complete uncoupling takes place not before the holding portion 10 is slightly (by about 3°) tilted or pivoted towards the side of inlet 16. In this position, the head member 14 slides out of the inlet 16 of holding portion 10 instantaneously.

When the uncoupling operation is to take place in a single step or stage, the guiding channel 24 or the abutment side 32 of the guiding channel 24 which is loaded by the head member 14 of the coupling portion under a pulling force, respectively, is provided so as to be slightly inclined in the direction of pull. Also, an extension approximately normal to the direction of pull is sufficient for single-step uncoupling. Under a tension or pulling load, the uncoupling operation takes place instantaneously when the lock bolt 18 has been moved to its unlocking position.

The disclosed connector is versatile in use and may be used for applications where spring safety hooks, shackles, tong-type hooks and the like have been used heretofore. The connector is particularly useful as a lock for safety belts, as a safety element for mountaineering outfit, as a retainer for military purposes, as a connector in agricultural harnesses, hoist ropes, etc.

The above described solution clearly reveals that it constitutes a structure that can be handled in extremely easy manner and wherein the lock bolt 18 is substantially completely relieved of loads. Accordingly, low forces only are required for unlocking and coupling. It is only the force of compression spring 34 that has to be overcome.

As appears from FIG. 1, the holding portion 10 is a relatively complex structure. Nevertheless, the holding portion may be manufactured economically by injection molding processes. The coupling portion 12 may be formed preferably of metal, especially stainless metal.

What we claim is:

1. A releasable connector, for use with a tension line and, comprising:
   a coupler formed with a neck and a spherical spherically shaped head,
   a holder formed with an axis and having oppositely disposed first and second ends disposed on said axis, said first end being adapted for connection to such tension line and said second end being adapted for coupling to said coupler such that tension applied to such line will direct the resultant force along said axis, said holder including a guide channel extending lateral to said axis and opening to one side of said holder for receipt of said head, said holder being formed at said second end with an axially through, laterally opening, recess for receipt of said neck, said holder being still further formed with a lock bolt-receiving, through bore coextensive with said axis and,
   a lock bolt received telescoptically in said bore and extending into said guide channel for holding said head captive in said channel, said lock bolt being formed on one side thereof with a recess for registration with said head when said bolt is telescoped to an unlocked position to provide for passage of said head between said recess and the opposite side of said channel to free said head for release from said channel.

2. The connector according to claim 1, characterized in that:
   said holder is formed at said second end, within said channel, with a sperically shaped seat for nesting thereon of said head when said coupler and holder are coupled together.

3. The connector according to claim 1, characterized in that:
   the lateral sides of said guide channel taper outwardly away from one another toward said second end.

4. The connector according to claim 1, characterized in that:
   said guide channel is formed at said second end with a wall which projects at an oblique angle with respect to said axis.

5. The connector according to claim 1, characterized in that:
   said holder includes biasing means urging said lock bolt away from its locking position to the unlocking position.

6. The connector according to claim 5 characterized in that:
   said lock bolt is formed with a head projecting from said bore at said first end of said coupler.

7. The connector according to claim 6, characterized in that:
   said head of said lock bolt is in the form of a pushbutton.

8. The connector according to claim 7, characterized in that:
   said holder is formed at said first end with a counter bore disposed coaxially with said first mentioned bore.

* * * * *

UNITED STATES PATENT AND TRADEMARK OFFICE
CERTIFICATE OF CORRECTION

PATENT NO. : 4,416,037
DATED : November 22, 1983
INVENTOR(S) : Rudolf Panthofer, et al.

It is certified that error appears in the above-identified patent and that said Letters Patent is hereby corrected as shown below:

Column 3, Line 34: Delete "4" and insert therefor --14--

Signed and Sealed this

Third Day of April 1984

[SEAL]

Attest:

GERALD J. MOSSINGHOFF

*Attesting Officer*   *Commissioner of Patents and Trademarks*